United States Patent
Jeske et al.

(10) Patent No.: US 7,257,133 B2
(45) Date of Patent: Aug. 14, 2007

(54) METHOD FOR ESTIMATING OFFSET FOR CLOCKS AT NETWORK ELEMENTS

(75) Inventors: Daniel R. Jeske, Eatontown, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1128 days.

(21) Appl. No.: 10/261,252

(22) Filed: Sep. 30, 2002

(65) Prior Publication Data

US 2004/0062280 A1    Apr. 1, 2004

(51) Int. Cl.
*H04L 7/00*    (2006.01)
(52) U.S. Cl. .................. 370/507; 370/509; 370/516
(58) Field of Classification Search .......... 370/507, 370/509, 516
See application file for complete search history.

(56) References Cited

U.S. PATENT DOCUMENTS

| | | | |
|---|---|---|---|
| 5,907,685 A | 5/1999 | Douceur | |
| 6,023,769 A | 2/2000 | Gonzalez | |
| 6,661,810 B1 * | 12/2003 | Skelly et al. | 370/516 |
| 7,023,884 B2 * | 4/2006 | Chuah et al. | 370/507 |
| 7,051,246 B2 * | 5/2006 | Benesty | 714/700 |
| 7,103,124 B1 * | 9/2006 | Lindskog et al. | 375/354 |

OTHER PUBLICATIONS

D.L. Mills, "Improved Algorithms for Synchronizing Computer Network Clocks," IEEE/ACM Trans. on Networking, vol. 3, No. 3, Jun. 1995.
V. Paxson, "On Calibrating Measurements of Packet Transit Times," "Longer Version," from ftp://ftp.ee.lbl.gov/papers/vp-clocks-sgmetrics98ps.gz, Mar. 1998.
V. Paxson, "On Calibrating Measurements of Packet Transit Times," "Shorter Version," from Proc. SIGMETRICS '98.

* cited by examiner

*Primary Examiner*—Melvin Marcelo

(57) ABSTRACT

A new algorithm for clock offset estimation for resources distributed across a network (such as the Internet). By exchanging a sequence of time-stamped messages between pairs of network nodes and separately estimating variable delays for each message direction, present inventive embodiments provide more accurate estimates for clock offset between node pairs. Present inventive algorithms operate in a variety of peer and server network configurations while providing significant improvement in convergence speed and accuracy.

13 Claims, 1 Drawing Sheet

METHOD FOR ESTIMATING OFFSET FOR CLOCKS AT NETWORK ELEMENTS

RELATED INVENTION

This application is related to subject matter disclosed in co-pending, commonly owned application Ser. No. 09/740,252 by present applicants and others, which co-pending application is hereby incorporated by reference in its entirety.

FIELD OF THE INVENTION

The present invention relates to synchronization of clocks. More specifically, the present invention relates to estimation and correction of clock offset in distributed resources interconnected by a network, such as the Internet.

BACKGROUND OF THE INVENTION

Accurate and reliable time information is necessary for many systems and applications involving distributed resources, including networked systems and processes typified by the Internet. In such systems, different functional elements are required to have their clocks synchronized. Clock synchronization involves two aspects: frequency synchronization and time synchronization. The former means that element clocks run at the same frequency, and the latter means that elements agree at a particular epoch with respect to the coordinated universal time (UTC), i.e., there is no offset between element clocks. For many purposes, it is appropriate to focus on estimating clock offset and to assume higher order effects, such as the frequency offset, can be ignored or provided for separately.

One application in which clock synchronization becomes essential is in the transport of speech packets over the Internet. Thus, for example, if a network element knows the scheduled playout time of a voice packet at a destination and shares a common notion of time with the destination, it can schedule the transmission of the voice packet to the destination accordingly. Alternatively, if the network element knows that the playout time for the voice packet has passed, it can discard the packet and avoid unnecessarily transmitting it to the destination where it would be discarded anyway. Another example application in which synchronization proves necessary is in the transport of packets from a core network to base stations in a wireless network. That is, transmission of packets on a radio link (e.g., from the base station to the mobile device) is usually synchronous, and it is important to ensure that the core network delivers the packet to the base station in time.

In certain wireless cellular systems, it is possible to transmit multiple copies of the same frame from different base stations to a mobile device whenever the mobile device can receive a sufficiently strong average signal from both base stations, although there will still be instantaneous variations on the received signal due to fast fading. The mobile device then combines the multiple copies prior to decoding. In an unreliable radio environment this greatly improves the probability that the frame is received correctly due to signal diversity. This technique, called soft handoff or sometimes macrodiversity, relies on the fact that the transmissions from the multiple base stations are synchronized in time, so that the mobile can combine the copies without ambiguity. In this context as well it is important for a common notion of time across multiple base stations when needed and an efficacious way to achieve this is through the mechanism and processing technique described in this invention. Therefore, it is often important that the base stations be synchronous with the core network.

Synchronizing the clocks is a two step process: first, the magnitude of the offset between the clocks is estimated, and then one of the clocks is adjusted, as needed. Clocks inherently tend to drift and therefore offset estimation and correction must be done on a continuing basis.

Clock synchronization issues have been extensively addressed in the literature. See, for example, D. Mills, Internet time synchronization: the Network Time Protocol, *IEEE Trans. Communications,* Vol. 39, No. 10, October 1991; D. Mitra, Network synchronization: analysis of a hybrid of master-slave and mutual synchronization, *IEEE Trans. Communications,* COM-28, 8 (August 1980), pp. 1245-1259; and N. W. Rickert, Non Byzantine clock synchronization—a programming experiment, *ACM Operating Systems Review* 22,1 (January 1988), pp. 73-78.

A well-known clock synchronization protocol that has been successfully deployed in the Internet is the Network Time Protocol (NTP), described, for example, in D. Mills, *Network Time Protocol (version 3) Specification, Implementation and Analysis RFC* 1305, March 1992. One of the most important network clock synchronization issues addressed by NTP is how to use the collected data to estimate the clock offset between a pair of network elements.

In V. Paxson, On Calibrating Measurements of Packet Transit Times, LBNL-41535, ftp://ftp.ee.lbl.gov/papers/vp-clocks-sigmetrics98.ps.gz, March, 1998 (and in a shortened paper with the same title published in *Proc. ACM Sigmetrics98,* Jun. 22-26, 1998), the author proposed a new algorithm for clock offset estimation. For easy reference, this algorithm will be referred to as the Separate Direction Estimation Algorithm (SDEA) and the cited papers as Paxson. While SDEA can provide improved performance relative to the NTP algorithm, SDEA nevertheless suffers from significant limitations, especially in applying SDEA to contexts in which loading is different for each of the directional links between pairs of network elements. The incorporated application describes techniques by which limitations of the NTP algorithm and SDEA are overcome and SDEA techniques are extended and improved. Increasingly stringent demands on network performance have caused workers in the field to seek other broadly applicable improved clock offset estimation techniques.

SUMMARY OF THE INVENTION

Limitations of the prior art are overcome and a technical advance is made in accordance with the present invention, illustrative embodiments of which are presented in the following detailed description. In particular, the present inventive provides methods for overcoming limitations of the NTP algorithm and SDEA in deriving estimates of clock offset with increased lower error.

In addition to estimating the clock offset, present inventive techniques also develop an estimator for the bias of the offset estimator and provide a bias-corrected offset estimator. As a result, for typical transmission delay distributions, the present inventive algorithms show significant reductions in their mean squared error.

In accordance with one aspect of present inventive methods, messages are exchanged (bi-directionally) between pairs of network elements, such messages including timestamps indicative of sending and receiving times noted at each stop. Because variable components of delay for each message direction need not be characterized by identical probability distribution functions, e.g., when links in each direction are differently loaded, undesired bias of estimates for clock offset can emerge. The present inventive methods propose a new estimator based on the exchange of timing messages, subsequently referred to as the sufficient statistic (SS) estimator. The SS estimator is shown, under one typical set of assumptions, to be the minimum variance estimator within the class of linear unbiased estimators based on the ordered one-way delay measurements. Illustrative embodiments of the present invention further employ a bootstrap methodology to obtain a closed form estimator of clock offset bias from which a bias-corrected estimator of the clock offset can be derived.

DETAILED DESCRIPTION

Network clock synchronization of a pair of network elements typically involves exchanges of data packets (timing messages) between each element of the pair. One of such a pair of elements is referred to as a sender, and the other as a receiver with respect to a particular packet. Based on time stamps contained in these timing messages, the clock offset between the sender and the receiver is estimated.

Figure 1:
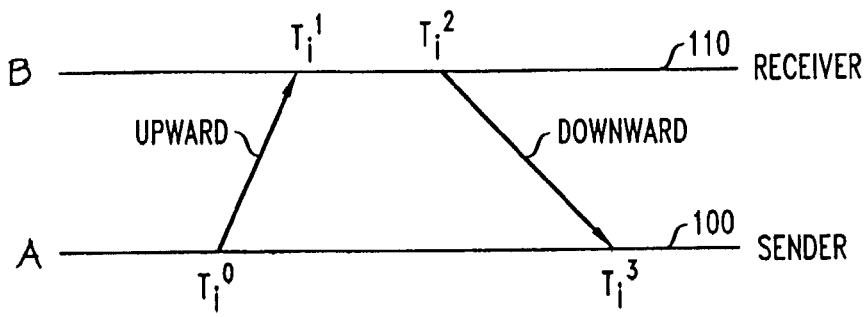
FIG. 1 illustrates time relations in sending messages between network elements.

More specifically, timing messages are sent between network elements as shown in FIG. 1, where activities at a sender A (100) and a receiver B (110) are shown for a particular round of message exchanges. FIG. 1 illustrates the i-th exchange between A and B, that begins with A sending a message to B which includes a time stamp $T_i^0$ indicating the time as known at A when the message is sent. Immediately upon reception of this message, B puts a time stamp $T_i^1$ in the received message. Just before B sends the message back to A (which is not necessarily immediately), it places another time stamp $T_i^2$ on the message. When A receives the returned message from B, it records another time stamp $T_i^3$ on the message. After n such exchanges, A has the sequence of observations $$\{T_i^0, T_i^1, T_i^2, T_i^3\}_{i=1}^n$$

from which to estimate the clock offset between itself and B.

Define $\theta$ to be the (unknown) offset of clock B, relative to clock A. It follows that if at a given instant clock B shows time $t_B$ and clock A shows time $t_A$ then $t_B = t_A + \theta$. The sojourn times for the A→B and B→A timing messages are $X_i = T_i^1 - T_i^0$ and $Y_i = T_i^3 - T_i^2$, respectively. Apart from the offset of clock B from clock A, two other components of the message sojourn times are propagation delay and network delay. Propagation delay corresponds to the amount of time required for a timing message to travel across the transmission medium (e.g., optical fiber) between A and B if there were no other intervening delays. In general, the propagation delay is fixed and quite small, on the order of nanoseconds, for example. It is customarily assumed that the (unknown) propagation delays in the two transmission directions A→B and B→A are approximately the same, and we denote the common value by d. Network delay arises due to congestion in the network that requires messages to sit in one or more queues before being granted the resources needed to continue its journey. Network delay can be on the order of milliseconds, or even seconds, and is the variable component of sojourn times. We let $e_i^{AB}$ and $e_i^{BA}$ denote the network delays associated with the A→B and B→A timing messages, respectively.

Define $X_i = d + \theta + e_i^{AB}$ and $Y_i = d - \theta + e_i^{BA}$. In general the two directions would have different traffic characteristics and thus the network delays in each path are potentially different. Given a certain number of samples, N, Paxson, supra, proposed estimating $\theta$ by $$\hat{\theta} = \left(\min_{1 \leq i \leq N} X_i - \min_{1 \leq i \leq N} Y_i\right) / 2,$$

based on the notion that the minimum sample value in each direction yields the sample that has the least amount of network delay associated with it. Note that the unknown network delay in each direction serves as "noise" in the offset estimation process and therefore, the minimum sample in each direction may be viewed as the clock offset sample least corrupted by "noise". Consequently, it represents the samples of X and Y that are taken by Paxson as closest to $\theta$.

Derivation of Sufficient Statistic Estimator

The present invention includes a method for processing the samples $\{X_i: i=1, 2, \ldots, N\}$ and $\{Y_i: i=1, 2, \ldots, N\}$ that yields a considerably more accurate estimate of $\theta$ than Paxson's method cited above. The development of the present inventive estimating method, hereinafter referred to as the Sufficient Statistic (SS) estimator will now be described in detail.

The SS estimator is derived under the assumption that the unknown network delays $e_i^{AB}$ and $e_i^{BA}$ are exponentially distributed random variables. However, as will be illustrated later, the improved accuracy it exhibits is robust to the exponential assumption. The mean of the exponential distribution for all samples in a given direction is assumed to be the same, but the mean value in the two directions may be different. The derivation of the SS estimator and its properties are now described.

Suppose $F_{AB}(\cdot)$ and $F_{BA}(\cdot)$ are exponential distributions with mean values $\lambda_{AB}$ and $\lambda_{BA}$, respectively. It follows that $F(x) = 1 - e^{-\lambda_{AB}(x-\theta-d)}$, $x \geq \theta + d$, and $G(y) = 1 - e^{-\lambda_{AB}(y-\theta-d)}$, $y \geq \theta + d$. The likelihood function, $L \equiv L(\theta, d, \lambda_{AB}, \lambda_{BA})$, based on the observations $\{(X_i, Y_i)\}_{i=1}^n$ is $$L = \{\lambda_{AB}^n e^{n\lambda_{AB}(\theta+d)} e^{-\lambda_{AB} T_2} \times 1(T_1 \geq \theta + d)\} \times \{\lambda_{BA}^n e^{n\lambda_{BA}(-\theta+d)} e^{-\lambda_{BA} S_2} \times I(S_1 \geq \theta + d)\},$$

where $$(T_1, T_2, S_1, S_2) = \left(\min_{1 \leq i \leq n} X_i - \sum_{i=1}^n X_i, \min_{1 \leq i \leq n} Y_i, \sum_{i=1}^n Y_i\right)$$

is a sufficient statistic (see, for example, Mood, Graybill and Boes, *Introduction to the Theory of Statistics,* Prentice-Hall, 1997, for a discussion of a sufficient statistic). The marginal distributions of the sufficient statistic are easy to obtain. Indeed, $T_1$ and $T_2$ have translated (by $\theta+d$) exponential and gamma distributions with parameters $n\lambda_{AB}$ and $(n,\lambda_{AB})$, respectively. Likewise, $S_1$ and $S_2$ have translated (by $-\theta+d$) exponential and gamma distributions with parameters $n\lambda_{BA}$ and $(n,\lambda_{BA})$, respectively. It follows that the sufficient statistic estimator, $$\tilde{\theta} = \frac{1}{2}\left[\frac{nT_1 - T_2/n}{n-1} - \frac{nS_1 - S_2/n}{n-1}\right]$$

is an unbiased estimator of $\theta$.

We now provide an argument that shows $\tilde{\theta}$ is the best linear unbiased estimator (BLUE) of $\theta$ based on the order sequences $\{X_{(i)}\}_{i=1}^n$ and $\{Y_{(i)}\}_{i=1}^n$ (i.e., $\tilde{\theta}$ is the ordered-BLUE or o-BLUE of $\theta$). [Note: $\{X_{(i)}\}_{i=1}^n$ is the sequence obtained by arranging the original sequence $\{X_i\}_{i=1}^n$ in order of increasing value. Therefore, $X_{(1)} \leq X_{(2)} \ldots \leq X_{(n)}$. Similarly $\{Y_{(i)}\}_{i=1}^n$ is obtained by ordering the original sequence $\{Y_i\}_{i=1}^n$.] For arbitrary sequences of constants, $\{a^i\}_{i=1}^n$ and $\{b_i\}_{i=1}^n$, consider the estimator $$T = \sum_{i=1}^n a_i X_{(i)} + \sum_{i=1}^n b_i Y_{(i)}.$$

For $1 \leq i \leq n$, define $$\mu_i = \sum_{j=n-i+1}^n 1/j$$

and $$\sigma_i^2 = \sum_{j=n-i+1}^n 1/j^2.$$

It is well know (see, for example, H. A. David, *Order Statistics,* John Wiley, 1981, chapter 3) that $E(X_{(i)}) = \mu_i/\lambda_{AB}$, $Var(X_{(i)}) = \sigma_i^2/\lambda_{AB}^2$, and for $1 \leq r < s \leq n$, $Cov(X_{(r)}, X_{(s)}) = Var(X_{(r)})$. Replacing $\lambda_{AB}$ with $\lambda_{BA}$ gives the corresponding expressions for the means, variances and covariances of the $\{Y_{(i)}\}_{i=1}^n$ sequence. It follows that $$Var(T) = \sum_{i=1}^n a_i^2 \frac{\sigma_i^2}{\lambda_{AB}^2} + \qquad (8)$$

$$2\sum_{i=1}^n \sum_{j=i+1}^n a_i a_j \frac{\sigma_i^2}{\lambda_{AB}^2} + \sum_{i=1}^n b_i^2 \frac{\sigma_i^2}{\lambda_{BA}^2} + 2\sum_{i=1}^n \sum_{j=i+1}^n b_i b_j \frac{\sigma_i^2}{\lambda_{BA}^2}$$

It can also be shown that there are four necessary and sufficient conditions for T to be an unbiased estimator of $\theta$ and they are $$\sum_{i=1}^n a_i = 1/2, \sum_{i=1}^n b_i = -1/2, \sum_{i=1}^n a_i \mu_i = 0, \sum_{i=1}^n b_i \mu_i = 0. \qquad (9)$$

Using Lagrange multipliers it can be shown that the minimum of (8), subject to (9), is achieved when $b_i = -a_i$ with $a_i = \frac{1}{2} + 1/(2n)$, and $a_i = -1/[2n(n-1)]$, for $2 \leq i \leq n$. It follows that $T \equiv \tilde{\theta}$ and thus $\tilde{\theta}$ is the o-BLUE of $\theta$.

Two results that prove useful in considering the details of the Lagrange minimization are:
1) the inverses of the variance-covariance matrices of $\{X_{(i)}\}_{i=1}^n$ and $\{Y_{(i)}\}_{i=1}^n$ are tridiagonol (useful when solving for the $\{a_i\}_{i=1}^n$ and $\{b_i\}_{i=1}^n$ in terms of the Lagrange multipliers), and
2) for $2 \leq i \leq n$, $(\mu_i - \mu_{i-1})/(\sigma_i^2 \sigma_{i-1}^2) = n - i + 1$ (useful when determining the values of the Lagrange multipliers). Finally we note that in the special case where $\lambda_{AB} = \lambda_{BA}$, it can similarly be shown that $\hat{\theta}$ is the o-BLUE of $\theta$ which provides new justification for Paxson's estimator.

Mean Squared Error Comparison of $\hat{\theta}$ and $\tilde{\theta}$ under Exponential Delays Since $\hat{\theta} = (T_1 - S_1)/2$, it is easy to see that $E(\hat{\theta}) = \theta + (1/\lambda_{AB} - 1/\lambda_{BA})/(2n)$ and $Var(\hat{\theta}) = (1/\lambda_{AB}^2 - 1/\lambda_{BA}^2)/(4n^2)$. Consequently, the mean squared error of $\hat{\theta}$, under the exponential distribution assumptions, is $$MSE(\hat{\theta}) = \frac{(1/\lambda_{AB} - 1/\lambda_{BA})^2 + 1/\lambda_{AB}^2 - 1/\lambda_{BA}^2}{4n^2} \qquad (10)$$

The variance of $\tilde{\theta}$ can be found by substituting the minimizing values of $\{a_i\}_{i=1}^n$ and $\{b_i\}_{i=1}^n$ into (8). Alternatively, we can work directly from (7) but will need expressions for $Cov(T_1, T_2)$ and $Cov(S_1, S_2)$. (Note that $(T_1, T_2)$ and $(S_1, S_2)$ are independent implying the four cross-covariance terms are zero.) Since $$T_2 = \sum_{i=1}^n X_{(i)},$$

it follows that $$Cov(T_1, T_2) = \sum_{i=1}^n Cov(X_{(1)}, X_{(i)}) = nVar(X_{(1)}) = 1/(n\lambda_{AB}^2).$$

In the same way, $Cov(S_1, S_2) = 1/(n\lambda_{BA}^2)$. Combining the variances and covariances of $T_1$, $T_2$, $S_1$ an $S_2$ with (7) gives $$Var(\tilde{\theta}) = \frac{1/\lambda_{AB}^2 + 1/\lambda_{BA}^2}{4n(n-1)} \qquad (11)$$

Table 1 presents illustrative results for the case where A→B Network Delays are exponential with mean=1 and B→A Network Delays are exponential with mean=5. Root Mean Squared Error (RMSE) is the square root of MSE, and it is clear that the SS estimator has significantly smaller RMSE than Paxson's estimator.

TABLE 1

| No. Samples N | Root Mean Squared Error | |
|---|---|---|
| | Paxson | SS |
| 10 | .324 | .269 |
| 20 | .162 | .131 |
| 40 | .0810 | .0645 |

Bias Correction of $\hat{\theta}$

As pointed out above the estimator, $\hat{\theta}$, is in general a biased estimator of $\theta$. Since network delays in the two directions are often quite different, the bias can be significant in practice and some form of bias estimation and correction is warranted.

In this section, we estimate the bias in $\hat{\theta}$ using the bootstrap technique and develop a bias-corrected estimator of $\theta$. The bootstrap estimate of the bias of $\hat{\theta}$ yields to a closed form expression which is then used to define a bias-corrected estimator, $\hat{\theta}^{BC}$, of $\theta$. It will be seen that $\hat{\theta}^{BC}$, like $\hat{\theta}$, is a linear combination of the ordered sequences $\{X_{(i)}\}_{i=1}^{n}$ and $\{Y_{(i)}\}_{i=1}^{n}$.

Let F and G denote the cumulative distribution functions of the variable portions of the A→B and B→A network delays, respectively. It follows that the cumulative distribution functions of X and Y are $F(x)=F_{AB}(x-\theta-d)$, $x \geq \theta+d$, and $G(y)=F_{BA}(y+\theta-d)$, $y \geq -\theta+d$, respectively. Furthermore, the independence of the A→B and B→A transmission delays implies the joint distribution of X and Y is $H(x,y)=F(x)G(y)$. An iteration of n timing message exchanges yields a random sample $\{(X_i, Y_i)\}_{i=1}^{n}$ of observations. The nonparametric estimator of $H(x,y)$ is $\hat{H}(x,y)=\hat{F}(x)\hat{G}(y)$ where $\hat{F}(x)$ and $\hat{G}(y)$ are the usual empirical cumulative distribution functions based on the $$\{X_i\}_{i=1}^{n} \text{ and } \{Y_i\}_{i=1}^{n}$$

sequences, respectively.

Let $B(\hat{\theta})$ denote the bias of $\hat{\theta}$. Then, $$B(\hat{\theta}) = E_H\left(\min_{1 \leq i \leq N} X_i - \min_{1 \leq i \leq N} Y_i\right)/2 - \theta \quad (12)$$

$$= \left(\int_0^\infty [1-F(x)]^n dx - \int_0^\infty [1-G(y)]^n dy\right)/2 - \theta.$$

The bootstrap estimate of $B(\hat{\theta})$ is (see, e.g., Efron and Tibshirani, *An Introduction to the Bootstrap*, Chapman and Hall, 1993, section 10.2)

$$\hat{B}(\hat{\theta}) = E_{\hat{H}}\left(\min_{1 \leq i \leq n} X_i - \min_{1 \leq i \leq n} Y_i\right)/2 - \hat{\theta} = \quad (13)$$

$$\left(\int_0^\infty [1-\hat{F}(x)]^n dx - \int_0^\infty [1-\hat{G}(y)]^n dy\right)/2 - \hat{\theta}.$$

Note that to obtain (13), the unknown joint distribution function H required by the expectation in (12) was replaced by the nonparametric estimator, $\hat{H}$, and the unknown $\theta$ was replaced by $\hat{\theta}$.

Let $\{X_{(i)}\}_{i=1}^{n}$ and $\{Y_{(i)}\}_{i=1}^{n}$ denote the order statistics of the $\{X_{(i)}\}_{i=1}^{n}$ and $\{Y_{(i)}\}_{i=1}^{n}$ sequences, respectively. Define $X_{(0)}=Y_{(0)}=0$ and $X_{(n+1)}=Y_{(n+1)}=\infty$. With $I(\cdot)$ as the usual indicator function, it follows that $$1-\hat{F}(x) = \sum_{i=1}^{n+1} \frac{n-i+1}{n} \times I[X_{(i-1)} \leq x < X_{(i)}] \quad (14)$$

and $$1-\hat{G}(y) = \sum_{i=1}^{n+1} \frac{n-i+1}{n} \times I[Y_{(i-1)} \leq y < Y_{(i)}] \quad (15)$$

Combining (13)-(15) gives $$\hat{B}(\hat{\theta}) = \sum_{i=1}^{n}\left(\frac{n-i+1}{n}\right)^n [X_{(i)} - X_{(i-1)} - Y_{(i)} + Y_{(i-1)}]/2 - \hat{\theta} \quad (16)$$

Having an estimate of $B(\hat{\theta})$ available, a bias-corrected estimator can be formed $$\hat{\theta}^{BC} = \hat{\theta} - \hat{B}(\hat{\theta}) \quad (17)$$

$$= 2\hat{\theta} - \sum_{i=1}^{n}\left(\frac{n-i+1}{n}\right)^n [X_{(i)} - X_{(i-1)} - Y_{(i)} + Y_{(i-1)}]/2$$

$$= X_{(1)} - Y_{(1)} - \sum_{i=1}^{n}\left(\frac{n-i+1}{n}\right)^n [X_{(i)} - X_{(i-1)} - Y_{(i)} + Y_{(i-1)}]/2.$$

The closed form expression for $\hat{\theta}^{BC}$ warrants some accent as in many cases bootstrap estimators require evaluation via monte-carlo resampling of the empirical distribution functions. Defining $w_1 = \frac{1}{2} + [(n-1)/n]^n/2$ and $w_i = -[(n-i+1)/n]^n/2 + [(n-i)/n]^n/2$, for $2 \leq i \leq n$, it is easy to verify that $$\hat{\theta}^{BC} = \sum_{i=1}^{n} w_i (X_{(i)} - Y_{(i)})$$

and that $$\sum_{i=1}^{n} w_i = \frac{1}{2}.$$

In contrast, $\hat{\theta}$ is the linear combination of the $X_{(i)}-Y_{(i)}$ that has the first weight equal to $\frac{1}{2}$ and all subsequent weights are equal to zero. It has been recognized (see, for example, Efron and Tibshirani 1993, supra, section 10.6) that bias-corrected estimators do not always have smaller mean squared error than the uncorrected estimator. However, we will demonstrate in what follows that for common clock offset contexts, $\hat{\theta}^{BC}$ does have smaller mean squared error than $\hat{\theta}$.

Mean Squared Error Comparison of $\hat{\theta}$, $\hat{\theta}^{BC}$ and $\tilde{\theta}$ under Exponential Delays Previously, formulas were given in (10) and (11) for the MSE of $\hat{\theta}$ and $\tilde{\theta}$. To evaluate the MSE of $\hat{\theta}^{BC}$, it is convenient to use the representation $$\hat{\theta}^{BC} = \sum_{i=1}^{n} w_i (X_{(i)} - Y_{(i)})$$

from which it follows that $$E(\hat{\theta}^{BC}) = \sum_{i=1}^{n} w_i [E(X_{(i)}) - E(Y_{(i)})]$$

and $$Var(\hat{\theta}^{BC}) = Var\left(\sum_{i=1}^{n} w_i X_{(i)}\right) + Var\left(\sum_{i=1}^{n} w_i Y_{(i)}\right).$$

Again using the means, variances and covariances of the $\{X_{(i)}\}_{i=1}^{n}$ and $\{Y_{(i)}\}_{i=1}^{n}$ sequences, it can be shown $$E(\hat{\theta}^{BC}) = \theta + \left(\sum_{i=1}^{n} w_i \mu_{(i)}\right) \times \left(\frac{1}{\lambda_{AB}} - \frac{1}{\lambda_{BA}}\right) \quad \text{and} \quad (18)$$

$$Var(\hat{\theta}^{BC}) = \left(\frac{1}{\lambda_{AB}^2} - \frac{1}{\lambda_{BA}^2}\right) \times \sum_{i=1}^{n} \left(w_i^2 + \sum_{k=i+1}^{n} w_i w_k\right) \sigma_i^2. \quad (19)$$

Combining (18) and (19), we find $$MSE(\hat{\theta}^{BC}) = \left(\frac{1}{\lambda_{AB}^2} + \frac{1}{\lambda_{BA}^2}\right) \times \sum_{i=1}^{n} \left(w_i^2 + 2\sum_{k=i+1}^{n} w_i w_k\right) \sigma_i^2 +$$

$$\left(\frac{1}{\lambda_{AB}} - \frac{1}{\lambda_{BA}}\right)^2 \times \left(\sum_{i=1}^{n} w_i \mu_{(i)}\right)^2.$$

The MSE of the three estimators $\hat{\theta}$, $\hat{\theta}^{BC}$ and $\tilde{\theta}$ only depend on the mean values, $1/\lambda_{AB}$ and $1/\lambda_{BA}$, of the network delay distributions and the sample size n. Tables 2-4 show the bias, standard deviation and root mean squared error (RMSE) for the cases where $(1/\lambda_{AB}, 1/\lambda_{BA})$ is (1, 5), (1, 10) and (1, 1), respectively. (We use the notation EXP(μ) in table headings to denote an exponential distribution with mean equal to μ.) Each table shows the three cases of n equal to 10, 20 and 40. From Table 2 and Table 3, we can see the bootstrap technique is quite effective at reducing bias. Moreover, we see that while it is true that the standard deviation of $\hat{\theta}^{BC}$ is larger than the standard deviation of $\hat{\theta}$, the overall RMSE is smaller. The increase in the standard deviation is more than neutralized by the reduction in the bias. Table 2 and Table 3 also show that $\hat{\theta}^{BC}$ is more competitive with the o-BLUE (in terms of RMSE) than is $\hat{\theta}$. Table 4, being a case where $\lambda_{AB} = \lambda_{BA}$, is a case where all three estimators are unbiased and we have shown that $\hat{\theta}$ is the o-BLUE. We see from Table 4 that all three estimators have essentially the same standard deviation.

TABLE 2

A→B Network Delays are EXP(1) and B→A Network Delays are EXP(5)

| | Bias | | | Standard Deviation | | | Root Mean Squared Error | | |
|---|---|---|---|---|---|---|---|---|---|
| n | $\hat{\theta}$ | $\hat{\theta}^{BC}$ | $\tilde{\theta}$ | $\hat{\theta}$ | $\hat{\theta}^{BC}$ | $\tilde{\theta}$ | $\hat{\theta}$ | $\hat{\theta}^{BC}$ | $\tilde{\theta}$ |
| 10 | −.200 | −.0851 | 0 | .255 | .276 | .269 | .324 | .289 | .269 |
| 20 | −.100 | −.0422 | 0 | .127 | .137 | .131 | .162 | .144 | .131 |
| 40 | −.0500 | −.0210 | 0 | .0637 | .0686 | .0645 | .0810 | .0718 | .0645 |

TABLE 3

A→B Network Delays are EXP(t) and B→A Network Delays are EXP(10)

| | Bias | | | Standard Deviation | | | Root Mean Squared Error | | |
|---|---|---|---|---|---|---|---|---|---|
| n | $\hat{\theta}$ | $\hat{\theta}^{BC}$ | $\tilde{\theta}$ | $\hat{\theta}$ | $\hat{\theta}^{BC}$ | $\tilde{\theta}$ | $\hat{\theta}$ | $\hat{\theta}^{BC}$ | $\tilde{\theta}$ |
| 10 | −.450 | −.192 | 0 | .502 | .543 | .530 | .675 | .576 | .530 |
| 20 | −.225 | −.0949 | 0 | .251 | .271 | .258 | .337 | .287 | .258 |
| 40 | −.113 | −.0472 | 0 | .126 | .135 | .127 | .169 | .143 | .127 |

TABLE 4

A→B Network Delays are EXP(1) and B→A Network Delays are EXP(1)

| | Bias | | | Standard Deviation | | | Root Mean Squared Error | | |
|---|---|---|---|---|---|---|---|---|---|
| n | $\hat{\theta}$ | $\hat{\theta}^{BC}$ | $\tilde{\theta}$ | $\hat{\theta}$ | $\hat{\theta}^{BC}$ | $\tilde{\theta}$ | $\hat{\theta}$ | $\hat{\theta}^{BC}$ | $\tilde{\theta}$ |
| 10 | 0 | 0 | 0 | .0707 | .0765 | .0745 | .0707 | .0765 | .0745 |
| 20 | 0 | 0 | 0 | .0354 | .0381 | .0363 | .0354 | .0381 | .0363 |
| 40 | 0 | 0 | 0 | .0177 | .0190 | .0179 | .0177 | .0190 | .0179 |

Robustness

When the network delays are not exponentially distributed, $\tilde{\theta}$ is no longer the o-BLUE. Moreover, $\tilde{\theta}$ (just like $\hat{\theta}$) will generally be biased unless the distributions of the A→B and B→A network delay components are identical. It is natural, therefore, to consider the bootstrap bias-corrected version of $\tilde{\theta}$ as a candidate estimator of clock offset. A parallel development to the section entitled "Bias Correction of $\hat{\theta}$" will show that the bootstrap bias-corrected estimator of $\tilde{\theta}$ is $$\tilde{\theta}^{BC} = \sum_{i=1}^{n} v_i (X_{(i)} - Y_{(i)}),$$

where $$v_1 = \frac{n}{n-1} \left\{ \frac{1}{2} - \frac{1}{2n^2} + \frac{1}{2}\left(\frac{n-1}{n}\right)^n \right\}$$

$$v_i = \frac{n}{n-1} \left\{ -\frac{1}{2n^2} - \frac{1}{2}\left(\frac{n-i+1}{n}\right)^n + \frac{1}{2}\left(\frac{n-i}{n}\right)^n \right\}, i \geq 2.$$

It is easy to verify that $$\sum_{i=1}^{n} v_i = 1/2.$$

Tables 5-8, obtained from simulating 2,000 message exchange sequences, compare the RMSE of all four estimators $\hat{\theta}$, $\hat{\theta}^{BC}$, $\tilde{\theta}$ and $\tilde{\theta}^{BC}$ in contexts where one or both of the distributions for the network delay components in the A→B and B→A directions is lognormal. (We use the notation $LN(\mu, \sigma^2)$ in the table headings to denote a lognormal distribution with mean $\mu$ and variance $\sigma^2$.) Tables 5 and 6 correspond to the case where the network delay components in both directions have lognormal distributions. Note that the means and variances of the A→B and B→A network delays in Tables 5 and 6 are the same as in Tables 2 and 3, respectively.

cantly. Although the standard deviation of $\hat{\theta}^{BC}$ and $\tilde{\theta}^{BC}$ are larger than their corresponding uncorrected estimators, the net result is an appreciable decrease in the RMSE. We also note that $\tilde{\theta}^{BC}$ is superior to $\hat{\theta}^{BC}$.

Tables 7 and 8 show the bias, standard deviation and RMSE when the network delay component in the A→B direction is exponential, and in the B→A direction is lognormal. The means and variances of the A→B and B→A network delays in Tables 5 and 6 are again the same as what they are in Tables 2 and 3, respectively. The conclusions that can be drawn from Tables 7 and 8 are the same as what was observed from Tables 5 and 6, viz., that the bootstrapping is quite effective at reducing bias and although the variance increases, the net result is a decrease in RMSE. Note that the rank order in Tables 7 and 8 of the four estimators with respect to RMSE is also consistent with what is shown in

TABLE 5

A→B Network Delays are LN(1, 1) and B→A Network Delays are LN(5, 25)

| | Bias | | | | Standard Deviation | | | | Root Mean Squared Error | | | |
|---|---|---|---|---|---|---|---|---|---|---|---|---|
| n | $\hat{\theta}$ | $\hat{\theta}^{BC}$ | $\tilde{\theta}$ | $\tilde{\theta}^{BC}$ | $\hat{\theta}$ | $\hat{\theta}^{BC}$ | $\tilde{\theta}$ | $\tilde{\theta}^{BC}$ | $\hat{\theta}$ | $\hat{\theta}^{BC}$ | $\tilde{\theta}$ | $\tilde{\theta}^{BC}$ |
| 10 | −.430 | −.320 | −.255 | −.134 | .255 | .285 | .272 | .316 | .499 | .429 | .373 | .343 |
| 20 | −.332 | −.264 | −.244 | −.173 | .174 | .196 | .179 | .205 | .374 | .329 | .302 | .268 |
| 40 | −.253 | −.207 | −.208 | −.161 | .119 | .138 | .121 | .141 | .279 | .249 | .241 | .214 |

TABLE 6

A→B Network Delays are LN(1, 1) and B→A Network Delays are LN(10, 100)

| | Bias | | | | Standard Deviation | | | | Root Mean Squared Error | | | |
|---|---|---|---|---|---|---|---|---|---|---|---|---|
| n | $\hat{\theta}$ | $\hat{\theta}^{BC}$ | $\tilde{\theta}$ | $\tilde{\theta}^{BC}$ | $\hat{\theta}$ | $\hat{\theta}^{BC}$ | $\tilde{\theta}$ | $\tilde{\theta}^{BC}$ | $\hat{\theta}$ | $\hat{\theta}^{BC}$ | $\tilde{\theta}$ | $\tilde{\theta}^{BC}$ |
| 10 | −.980 | −.737 | −.587 | −316 | .511 | .576 | .543 | .635 | 1.105 | .935 | .800 | .710 |
| 20 | −.738 | −.588 | −.544 | −386 | .345 | .393 | .357 | .411 | .815 | .707 | .651 | .563 |
| 40 | −.569 | −.466 | −.468 | −362 | .236 | .271 | .240 | .277 | .616 | .539 | .526 | .456 |

As with Tables 2 and 3, we see that the bootstrap bias-corrected estimators $\hat{\theta}^{BC}$ and $\tilde{\theta}^{BC}$ reduce bias signifi- Tables 5 and 6. For the cases considered, it is clear that the two best estimators are $\tilde{\theta}^{BC}$ and $\tilde{\theta}$ in that order.

TABLE 7

A→B Network Delays are EXP(1) and B→A Network Delays are LN(5, 25)

| | Bias | | | | Standard Deviation | | | | Root Mean Squared Error | | | |
|---|---|---|---|---|---|---|---|---|---|---|---|---|
| n | $\hat{\theta}$ | $\hat{\theta}^{BC}$ | $\tilde{\theta}$ | $\tilde{\theta}^{BC}$ | $\hat{\theta}$ | $\hat{\theta}^{BC}$ | $\tilde{\theta}$ | $\tilde{\theta}^{BC}$ | $\hat{\theta}$ | $\hat{\theta}^{BC}$ | $\tilde{\theta}$ | $\tilde{\theta}^{BC}$ |
| 10 | −.500 | −.395 | −.334 | −.217 | .261 | .292 | .279 | .323 | .564 | .491 | .435 | .389 |
| 20 | −.385 | −.313 | −.300 | −.224 | .169 | .193 | .175 | .202 | .420 | .368 | .347 | .302 |
| 40 | −.302 | −.252 | −.259 | −.207 | .116 | .133 | .118 | .136 | .323 | .285 | .284 | .248 |

TABLE 8

A→B Network Delays are EXP (1) and B→A Network Delays are LN(10, 100)

| | Bias | | | | Standard Deviation | | | | Root Mean Squared Error | | | |
|---|---|---|---|---|---|---|---|---|---|---|---|---|
| n | $\hat{\theta}$ | $\hat{\theta}^{BC}$ | $\tilde{\theta}$ | $\tilde{\theta}^{BC}$ | $\hat{\theta}$ | $\hat{\theta}^{BC}$ | $\tilde{\theta}$ | $\tilde{\theta}^{BC}$ | $\hat{\theta}$ | $\hat{\theta}^{BC}$ | $\tilde{\theta}$ | $\tilde{\theta}^{BC}$ |
| 10 | −1.057 | −.817 | −.680 | −.413 | .529 | .597 | .567 | .662 | 1.182 | 1.011 | .885 | .780 |
| 20 | −.784 | −.629 | −.589 | −.426 | .335 | .380 | .347 | .398 | .853 | .735 | .684 | .583 |
| 40 | −.611 | −.502 | −.512 | −.399 | .240 | .278 | .244 | .283 | .657 | .573 | .567 | .490 |

Analysis Summary

We showed that bootstrap bias correcting Paxson's estimator produces an estimator with smaller RMSE, relative to the uncorrected estimator. We derived the minimum variance unbiased estimator (i.e., the SS estimator) of clock offset (based on ordered sojurn times) under an exponential assumption for the variable part of network delays. We showed the SS estimator further reduces the RMSE, relative to the bias corrected Paxson estimator, with or without the exponential assumption. As such, the bias-corrected SS estimator is the robust estimator of choice for real applications.

Illustrative Network Applications

Figure 2:
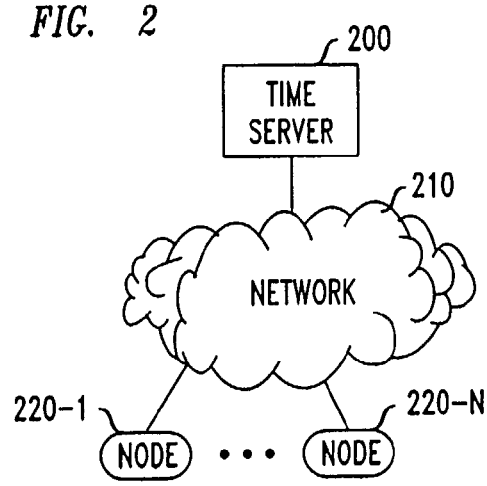
FIG. 2 shows an illustrative network embodiment of the present invention having a single server node for interacting with a plurality of other nodes to effect clock correction at such other nodes.

FIG. 2 shows an illustrative single-server network deployment of present inventive techniques. Specifically, FIG. 2 shows a time server 200 connected through a network 210 to a plurality of other network nodes 220-$i$, $i=1, 2, \ldots, N$. Nodes 220-$i$ may be routers, switches, servers of various kinds, network end points (including terminals, workstations or computers), or any other kind of network node. Each of nodes 220-$i$ has a clock and messaging facilities for exchanging messages with time server 200 in the manner described above. That is, time server 200 forms one of the pair of nodes and, in turn, one or more (typically all) of the nodes 220-$i$ forms the other of the node pair for purposes of exchanging time-stamped messages and deriving offset estimates and estimate bias information in accordance with the improved offset estimator described above. While each of the nodes 220-$i$ may have equal access to time server 200, priorities may be accorded some nodes 220-$i$, or some nodes 220-$i$ may be accorded access to server 200 more frequently.

By exchanging messages with nodes 220-$i$, time server 200 will provide clock offset estimates and estimate bias information as described above, which information is available at nodes 220-$i$ for correcting clock offset. Of course, N may have a value of 1, so that only a single network node device may interact with a particular time server. While time server 200 is shown as a separate dedicated function network node, it will be understood that the function of network node 200 may be included in a node performing other functions. Likewise, many network arrangements will have a plurality of time servers, each serving network nodes connected on a respective network or sub-network 210.

Figure 3:
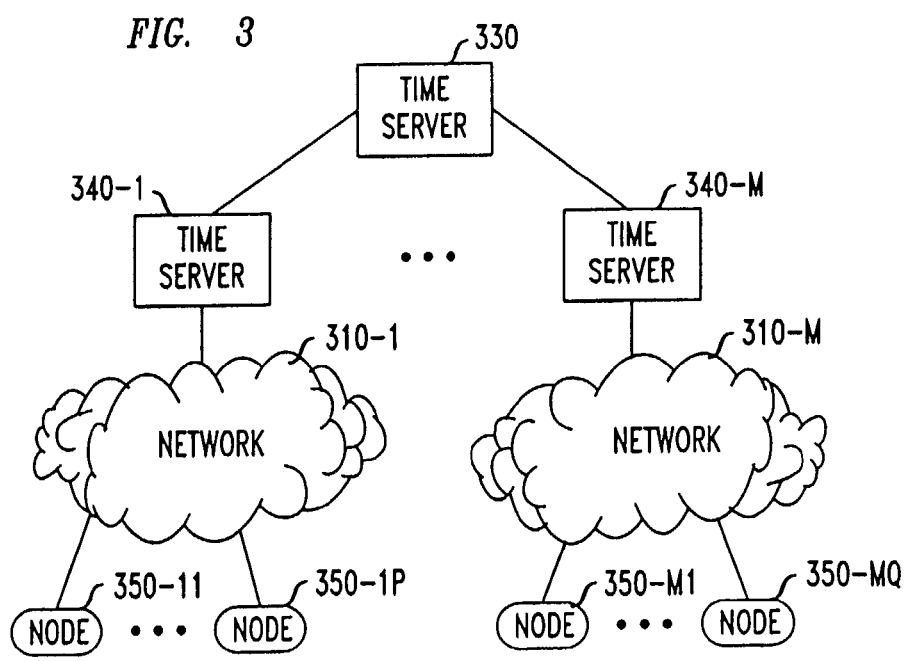
FIG. 3 shows an illustrative network embodiment of the present invention having a hierarchy of server nodes with lowest order server nodes for interacting with other network nodes to effect clock correction at such other nodes.

FIG. 3 shows an illustrative alternative network arrangement in which a plurality of time servers 330 and 340-$i$, $i=1, 2, \ldots, M$, are connected in hierarchical relation through a plurality of networks 310-$i$, $i=1, 2, \ldots, M$. In the illustrative arrangement of FIG. 3, only two levels are shown in the server hierarchy, but those skilled in the art will recognize that any number of levels of time servers may be used. Likewise, while the number of networks is shown equal to the number of nodes at the lowest hierarchical level, no such limitation is required in practicing the present invention using a hierarchical arrangement of time servers. Each of the networks 310-$i$ has one or more network nodes capable of accessing the respective time server connected to the network. By way of illustration, network 310-1 has nodes 350-11 through 350-1P connected to it. Likewise, network 310-M is shown having nodes 350-M1 through 350-MQ. Here, P and Q may be any integer.

In operation, time server 330 exchanges time-stamped messages with each of the time servers 340-$i$ to provide the latter with offset estimates and estimate bias information of the type illustrated above to permit clock correction at the illustrative (second-level) time servers 340-$i$. Each of the time servers 340-$i$ then serves the clock correction requirements of respective nodes 350-$xx$ in the same manner. Of course, when more than two hierarchical levels of time servers are used, each level (after the first or highest) derives clock synchronization information from a time server at the next highest level. The number of nodes will generally vary from one network 310-$i$ to another, and all or some of networks 310-$i$ may be sub-networks of a larger network. Some time servers may be connected to nodes such as 350-$xx$ and to a next lower order node as well. Some or all time servers may be located in the same local area or distributed over a wide area (including globally) to meet load and geographic distribution requirements for clock synchronization service.

Access to respective time servers by particular nodes (or subordinate time servers) may be scheduled (e.g., periodic), dependent upon availability of time server resources, dependent on prior clock offset behavior at particular nodes (or subsidiary time servers) or detected conditions at such nodes or subsidiary time servers. Exchange of messages and derivation of correction information in accordance with present inventive teachings may be initiated, in appropriate cases, by a particular time server or by a node (or subsidiary time server) for which the particular time server provides clock synchronization services. In each case, however, the time server acts as the reference source of time in determining offset using exchanges of time-stamped messages of the types described above. Thus, for example, a particular node (routinely, or in response to conditions detected at that node) may request that an associated time server initiate a synchronization sequence and supply the results to the particular node.

Numerous and varied particular applications of the present inventive principles, all within the spirit of the present description and scope of the attached claims, will prove useful to those skilled in the art. For example, while variable delays have been described in some of the illustrative embodiments and applications of the present invention as having exponential or lognormal probability distributions, principles and methods of the present invention are also applicable to embodiments and contexts in which such delays are better characterized in terms of other well-known distributions, e.g., gamma or Weibull distributions.

What is claimed is:

1. In a network having a plurality of network nodes, each node having a clock, a method for estimating offset of the clock at a first node, A, relative to the clock at a second node, B, the method comprising exchanging n rounds of ordered time-stamped messages between said nodes A and B, n being an integer, determining values for a pair of sequences of random variables $\{X_i\}_{i=1}^n$ and $\{Y_i\}_{i=1}^n$ related, respectively, to the sojourn times for ith of said A→B and B→A messages, i=1, 2, ..., n, wherein transit of messages from node A to node B are represented as A→B and transit of messages from node B to node A are represented as B→A, determining a statistic as a function of said $\{X_i\}_{i=1}^n$ and $\{Y_i\}_{i=1}^n$, and determining said estimate of offset as a function of said statistic.

2. The method of claim 1 wherein said statistic is given by $$(T_1, T_2, S_1, S_2) = \left(\min_{1 \leq i \leq n} X_i, \sum_{i=1}^n X_i, \min_{1 \leq i \leq n} Y_i, \sum_{i=1}^n Y_i\right).$$

3. The method of claim 2 wherein said determining of said estimate of offset as a function of said statistic comprises determining $$\tilde{\theta} = \frac{1}{2}\left[\frac{nT_1 - T_2/n}{n-1} - \frac{nS_1 - S_2/n}{n-1}\right].$$

4. The method of claim 1 wherein said random variables are $X_i = T_i^1 - T_i^0$ and $Y_i = T_i^3 - T_i^2$, respectively, where are $T_i^1 - T_i^0$ is the sojourn time for the ith A→B message and $T_i^3 - T_i^2$ is the sojourn time for the ith B→A message.

5. The method of claim 1 wherein at the ith of said rounds, i=1, ..., n, where n is an integer, said messages comprise from said node A, a first message to said node B comprising a time stamp $T_i^0$ indicating the current time at said node A when said first message is sent, from said node B, a second message to said node A comprising a time stamp $T_i^1$ indicating the current time at said node B when said first message was received, and a time stamp $T_i^2$ indicating the time at said node B at which said second message is sent, and wherein the method further comprises determining $T_i^3$, the time at which said second message is received at said node B.

6. The method of claim 5 further comprising determining at said first node for each i, i=1,2, ..., n $$X_i = T_i^1 - T_i^0 \text{ and } Y_i = T_i^3 - T_i^2,$$

where $$T_i^3 - T_i^2 = d - \theta + e_i^{BA}$$

$$T_i^1 - T_i^0 = d + \theta + e_i^{AB}, \text{ and}$$

wherein θ is the offset of the clock at said second node from the clock at said first node, d is the fixed delay experienced by a message from one of said nodes to the other of said nodes, $e_i^{AB}$ is the variable delay at said ith round for a message from said node A to said node B, $e_i^{BA}$ is the variable delay at said ith round for a message from said node B to said node A.

7. The method of claim 6 wherein the probability distribution for $e_i^{AB}$ and $e_i^{BA}$ need not be of the same family of distributions.

8. The method of claim 6 wherein the probability distribution for each of $e_i^{AB}$ and $e_i^{BA}$ is chosen from the set of probability distributions comprising exponential, lognormal, gamma and Weibull distributions.

9. In a network having a plurality of network nodes, each node having a clock, a method for estimating a bootstrapped bias-corrected offset, $\tilde{\theta}^{BC}$, of the clock at a first node, A, relative to the clock at a second node, B, the method comprising exchanging n rounds of ordered time-stamped messages between said nodes A and B, n being an integer, determining values for a pair of sequences of random variables $\{X_i\}_{i=1}^n$ and $\{Y_i\}_{i=1}^n$ relating, respectively, to the sojourn times for ith of said A→B and B→A messages, i=1, 2, ..., n, wherein transit of messages from node A to node B are represented as A→B and transit of messages from node B to node A are represented as B→A, and determining said bootstrapped bias-corrected estimate of offset in accordance with $$\tilde{\theta}^{BC} = \sum_{i=1}^n v_i(X_{(i)} - Y_{(i)}), \text{ where}$$

$$v_1 = \frac{n}{n-1}\left\{\frac{1}{2} - \frac{1}{2n^2} + \frac{1}{2}\left(\frac{n-1}{n}\right)^n\right\}, \text{ and}$$

$$v_i = \frac{n}{n-1}\left\{-\frac{1}{2n^2} - \frac{1}{2}\left(\frac{n-i+1}{n}\right)^n + \frac{1}{2}\left(\frac{n-i}{n}\right)^n\right\}, i \geq 2.$$

10. The method of claim 9 wherein at the ith of said rounds, i=1, ..., n, where n is an integer, said messages comprise from said node A, a first message to said node B comprising a time stamp $T_i^0$ indicating the current time at said node A when said first message is sent, from said node B, a second message to said node A comprising a time stamp $T_i^1$ indicating the current time at said node B when said first message was received, and a time stamp $T_i^2$ indicating the time at said node B at which said second message is sent, and wherein the method further comprises determining $T_i^3$, the time at which said second message is received at said node B.

11. The method of claim 10 further comprising determining at said first node for each i, i=1, 2, ..., n $$X_i = T_i^1 - T_i^0 \text{ and } Y_i = T_i^3 - T_i^2,$$

where $$T_i^3 - T_i^2 = d - \theta + e_i^{BA}$$

$$T_i^1 - T_i^0 = d + \theta + e_i^{AB}, \text{ and}$$

wherein θ is the offset of the clock at said second node from the clock at said first node, d is the fixed delay experienced by a message from one of said nodes to the other of said nodes, $e_i^{AB}$ is the variable delay at said ith round for a message from said node A to said node B, $e_i^{BA}$ is the variable delay at said ith round for a message from said node B to said node A.

12. The method of claim 11 wherein the probability distribution for $e_i^{AB}$ and $e_i^{BA}$ need not be of the same family of distributions.

13. The method of claim 11 wherein the probability distribution for each of $e_i^{AB}$ and $e_i^{BA}$ is chosen from the set of probability distributions comprising exponential, lognormal, gamma and Weibull distributions.

* * * * *